United States Patent [19]

Cunningham

[11] Patent Number: 5,790,352
[45] Date of Patent: Aug. 4, 1998

[54] MAGNETORESISTIVE HEAD WITH ASYMMETRIC LEADS

[75] Inventor: Earl Albert Cunningham, Rochester, Minn.

[73] Assignee: International Business Machines Corporation, Armonk, N.Y.

[21] Appl. No.: 920,090

[22] Filed: Aug. 26, 1997

Related U.S. Application Data

[63] Continuation of Ser. No. 689,538, Aug. 9, 1996, abandoned, which is a continuation of Ser. No. 250,877, May 31, 1994, abandoned.

[51] Int. Cl.⁶ ............................................ G11B 5/39
[52] U.S. Cl. ............................................... 360/113
[58] Field of Search .................................. 360/113, 121; 338/32 R; 324/252

[56] References Cited

U.S. PATENT DOCUMENTS

| | | | |
|---|---|---|---|
| 3,731,007 | 5/1973 | Masuda et al. | 179/100.2 |
| 3,860,965 | 1/1975 | Voegeli | 360/113 |
| 4,712,144 | 12/1987 | Klaassen | 360/113 |
| 4,807,073 | 2/1989 | Takeura et al. | 360/113 |
| 4,816,948 | 3/1989 | Kamo et al. | 360/113 |
| 4,833,559 | 5/1989 | Belk | 360/113 |
| 4,907,113 | 3/1990 | Mallary | 360/112 |
| 4,967,298 | 10/1990 | Mowry | 360/113 |
| 5,122,915 | 6/1992 | Klein et al. | 360/113 |
| 5,140,484 | 8/1992 | Maruyama | 360/113 |
| 5,315,469 | 5/1994 | McNeil | 360/119 |
| 5,331,493 | 7/1994 | Schwarz | 360/113 |
| 5,351,158 | 9/1994 | Shibata | 360/113 |
| 5,375,022 | 12/1994 | Gill et al. | 360/113 |

FOREIGN PATENT DOCUMENTS

| | | |
|---|---|---|
| 0519558 | 12/1992 | European Pat. Off. . |
| 0573154 | 12/1993 | European Pat. Off. . |
| 0573155 | 12/1993 | European Pat. Off. . |

OTHER PUBLICATIONS

Patent Abstracts of Japan, vol. 9, No. 327 (P–415), Dec. 21, 1985.

Patent Abstracts of Japan, vol. 12, No. 388 (P–771), Oct. 17, 1988.

Patent Abstracts of Japan, vol. 8, No. 109 (P–275), May 22, 1984.

D. Hannon et al., "Allicat Magnetoresistive Head Design and Performance", Digests of the Magnetic Recording Conference 1993, Magnetic Recording Heads, University of Minnesota, Sep. 13–15, 1993.

T. Anthony et al., "Dual Stripe Magnetoresistive Heads for High Density Recording" Digests of the Magnetic Recording Conference 1993, Magnetic Recording Heads, University of Minnesota, Sep. 13–15, 1993.

Ching Tsang et al., Gigabit Density Recording Using Dual–Element MR/Inductive Heads on Thin–Film Disks, IEEE Transactions on Magnetics, vol. 26, No. 5, Sep. 1990.

*Primary Examiner*—Stuart S. Levy
*Assistant Examiner*—George J. Letscher
*Attorney, Agent, or Firm*—Matthew J. Bussan

[57] ABSTRACT

An MR head includes an MR film electrically connected to two lead layers that are asymmetric with respect to at least one of thickness and resistance. In a preferred embodiment of the present invention, the MR head includes a write pole that extends over a thinner lead layer and that terminates over the MR film so that the write pole does not extend over a thicker lead layer. In another preferred embodiment of the present invention, a thinner lead layer is connected to a single-ended preamplification circuit, and a thicker lead layer is connected to a ground or reference voltage.

17 Claims, 7 Drawing Sheets

MAGNETORESISTIVE HEAD WITH ASYMMETRIC LEADS

This application is a continuation of application Ser. No. 08/689,538, filed Aug. 9, 1996 which is a continuation of application Ser. No. 08/250,877, filed May 31, 1994, both now abandoned.

BACKGROUND OF THE INVENTION

1. Field of the Invention

The present invention relates to magnetoresistive "MR" heads and, more particularly, to electrical leads for MR heads.

2. Description of the Related Art

MR heads, which often include both an MR read element and an inductive write element, are increasingly popular for recording and reading data stored in a magnetic medium. A primary advantage of MR heads is that they permit an increase in the bit density of magnetic recording systems.

A typical MR head is described in D. Hannon et al., "ALLICAT MAGNETORESISTIVE HEAD DESIGN AND PERFORMANCE", DIGESTS OF THE MAGNETIC RECORDING CONFERENCE 1993, MAGNETIC RECORDING HEADS, UNIVERSITY OF MINNESOTA, Sep. 13–15, 1993, at B2, and is schematically shown in FIG. 1 of the present application. FIG. 1 is a bottom view of the active surface of a conventional MR head 10, i.e., as viewed from a magnetic medium. An MR element 11 is sandwiched between a magnetic shield layer 12 and a magnetic shield/write pole layer 14.

Although not shown, the MR element 11 has a tri-layered structure, i.e., a soft adjacent layer, an intermediate film deposited on the soft adjacent layer, and an MR film deposited on the intermediate film. The soft adjacent layer is made of a soft magnetic material such as PERMALLOY, CoZrMo and the like. The intermediate film is made of a nonmagnetic material such as Ti, $SiO_2$ and the like. The MR film is made of a magnetoresistive material such as NiFe. The soft adjacent layer provides transverse magnetic biasing in the MR film via a biasing current flowing longitudinally through MR element 11. Longitudinal magnetic biasing of the MR film is provided by hard bias magnet layers 16 and 18, which abut against opposite ends of MR element 11 and are made of an electrically conductive and magnetically hard material such as a cobalt alloy, e.g., CoPtCr.

Hard bias magnet layers 16 and 18 and MR element 11 are each deposited on an insulating layer 20, which is deposited on magnetic shield layer 12. Magnetic shield layer 12 is made of a magnetically soft and physically hard material such as CoHfNb. Lead layers 22 and 24 are respectively deposited on hard bias magnet layers 16 and 18. Lead layers 22 and 24 are made of an electrically conductive material, and are electrically connected to opposite sides of MR element 11 via hard bias magnet layers 16 and 18, respectively.

An insulating layer 26 is deposited on lead layers 22 and 24 and MR element 11, and magnetic shield/write pole layer 14 made of PERMALLOY or other suitable material is deposited thereover. A write pole layer 28 made of PERMALLOY or other suitable material is deposited over magnetic shield/write pole layer 14, with an insulating layer 30 deposited therebetween.

Magnetic shield/write pole layer 14 and write pole layer 28 are magnetically coupled at a rear portion (not shown) to form a flux path of an inductive write element. A write coil (not shown) is formed through magnetic shield/write pole layer 14 and write pole layer 28. Accordingly, insulating layer 30 forms a write gap for writing information to a magnetic medium when current is applied to the write coil. The MR element 11 is used for reading information from the magnetic medium based on a so-called MR effect, wherein the MR film changes its resistance depending on its angle of magnetization.

Write pole layer 28 has a center line 32, which is offset from a center line 34 of MR element 11 to compensate for a skew in a rotary actuator, for example. The conventional MR head 10 is of the write wide/read narrow type, i.e., the tracks written onto the magnetic medium are wider than the tracks read. This occurs because write pole layer 28 has a width greater than that of MR element 11.

A nonlinearity problem in cross-track response at high recording densities has been recognized in MR heads, such as conventional MR head 10, wherein write pole layers are deposited on patterned lead layers. T. Anthony et al., "DUAL STRIPE MAGNETORESISTIVE HEADS FOR HIGH DENSITY RECORDING", DIGESTS OF THE MAGNETIC RECORDING CONFERENCE 1993, MAGNETIC RECORDING HEADS, UNIVERSITY OF MINNESOTA, Sep. 13–15, 1993, at B3, suggests that such nonlinearity originates from "bent bits" that are written on the magnetic medium as a result of patterned lead topography that is replicated in the write pole. Referring to FIG. I of the present application, a step where each of lead layers 22 and 24 rises above MR element 11 is replicated as a bump in each successive layer deposited thereon, including magnetic shield/write pole layer 14 and write pole layer 28. Because magnetic shield/write pole layer 14 and write pole layer 28 include these bumps, a phase difference will occur across each track as data is written on the magnetic medium, thereby producing "bent bits".

This problem could be solved by planarizing insulating layer 26 prior to depositing the subsequent layers. However, this solution would create additional problems. For example, contamination caused by lapping insulating film 26 would significantly degrade the performance of MR element 11. In addition, a planarizing step would undesirably add complexity and cost to the fabrication of MR head 10.

It is known that the "bent bit" problem can be reduced by decreasing the height of lead layers 22 and 24 by an equal amount. However, such a reduction in height causes an undesirable increase in the resistance of lead layers 22 and 24. It is also known that the resulting increase in resistance can be reduced by increasing the thickness of a rear portion of lead layers 22 and 24 remote from the magnetic medium, i.e., including a step at the rear portion lead layers 22 and 24. Nonetheless, such a stepped lead structure cannot completely compensate for the increase in resistance.

SUMMARY OF THE INVENTION

An object of the present invention is to provide an enhanced MR head capable of writing information to and reading information from magnetic disks, tapes or other magnetic media.

Another object of the present invention is to provide an MR head that minimizes any non-linearity in cross-track response at high recording densities.

A further object of the present invention is to provide an MR head that minimizes any non-linearity in cross-track response at high recording densities without introducing a contamination problem.

Yet another object of the present invention is to provide a method of fabricating an MR head that minimizes any replication of lead topography in a write pole.

Yet another object of the present invention is to provide an MR head having leads optimized for connection to a single-ended preamplification circuit.

In accordance with the present invention, an MR head has an MR film that is electrically connected to two lead layers, each having a different thickness. In a preferred embodiment of the present invention, the MR head includes a write pole that extends over the thinner lead layer and that terminates over the MR film so that the write pole does not extend over the thicker lead layer.

Also in accordance with the present invention, an MR head includes an MR film electrically connected to two lead layers, each having a different resistance. In another preferred embodiment of the present invention, the thinner lead layer is connected to a single-ended preamplification circuit, and the thicker lead layer is connected to a ground or reference voltage.

BRIEF DESCRIPTION OF THE DRAWINGS

The present invention will be described in greater detail with reference to the drawings, in which.

Similar numerals refer to similar elements throughout the drawings.

DESCRIPTION OF THE PREFERRED EMBODIMENTS

Figure 1:
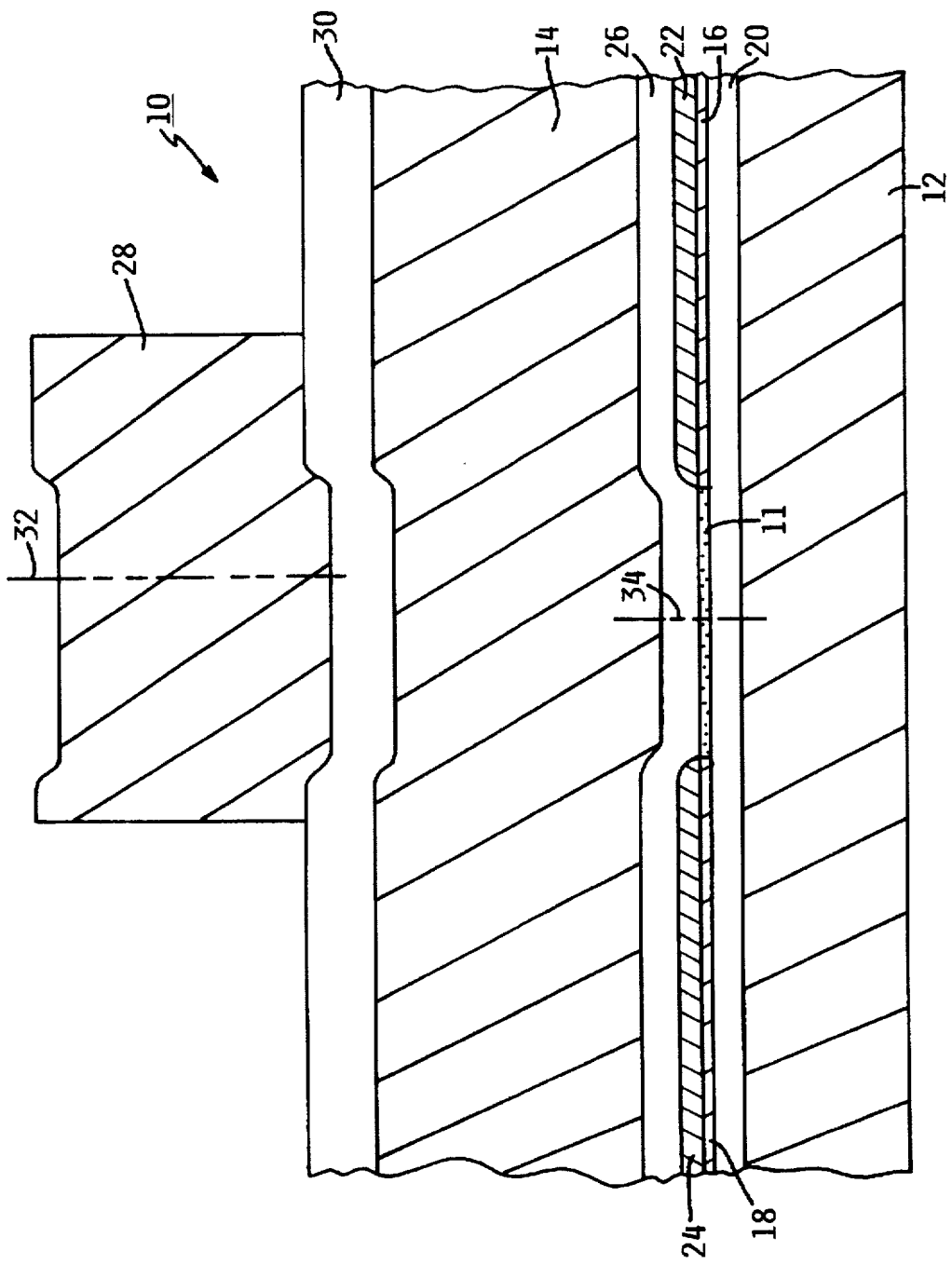
FIG. 1 is a bottom view of a conventional MR head.
Figure 2:
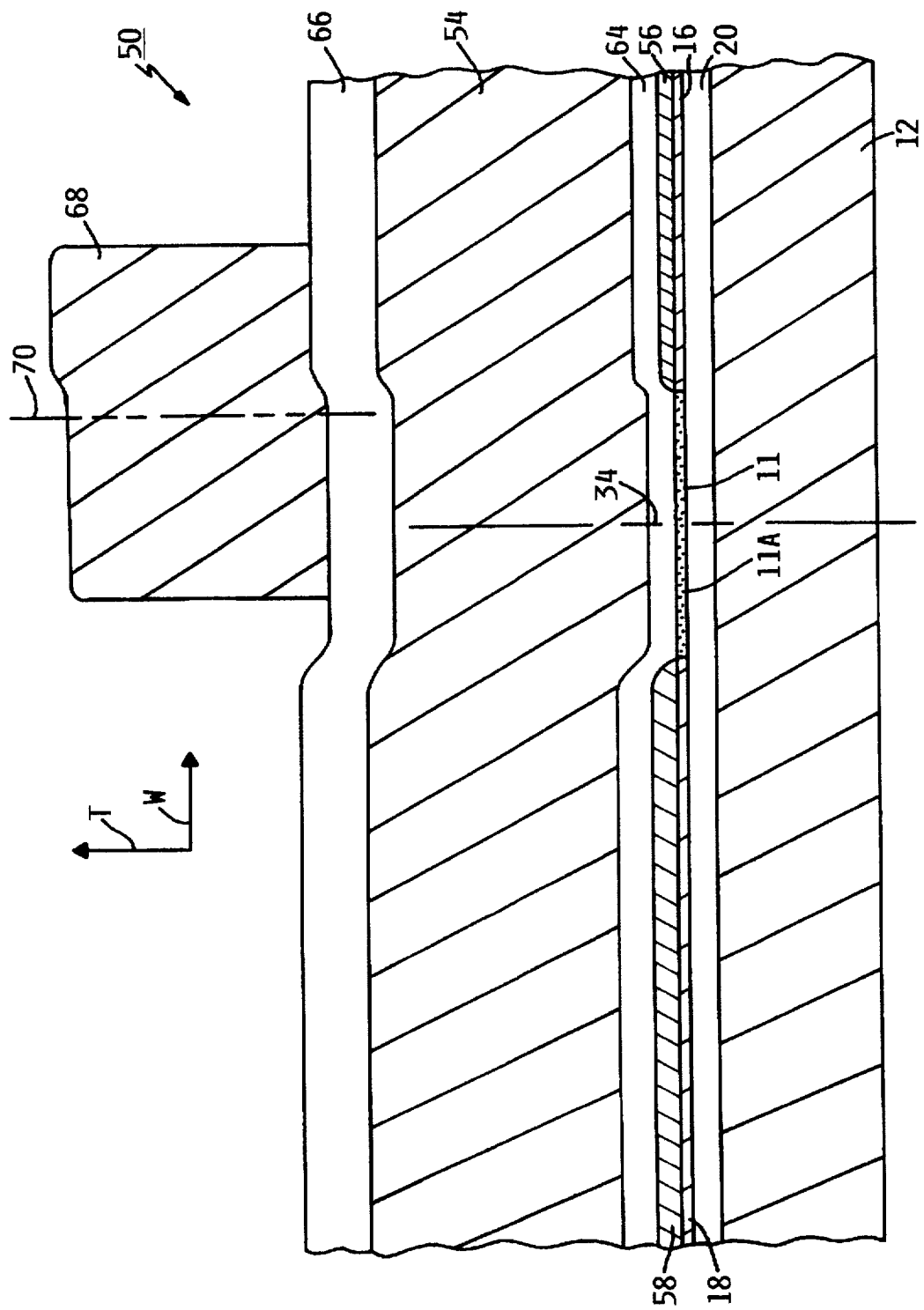
FIG. 2 is a bottom view of an MR head according to the present invention.
Figure 3:
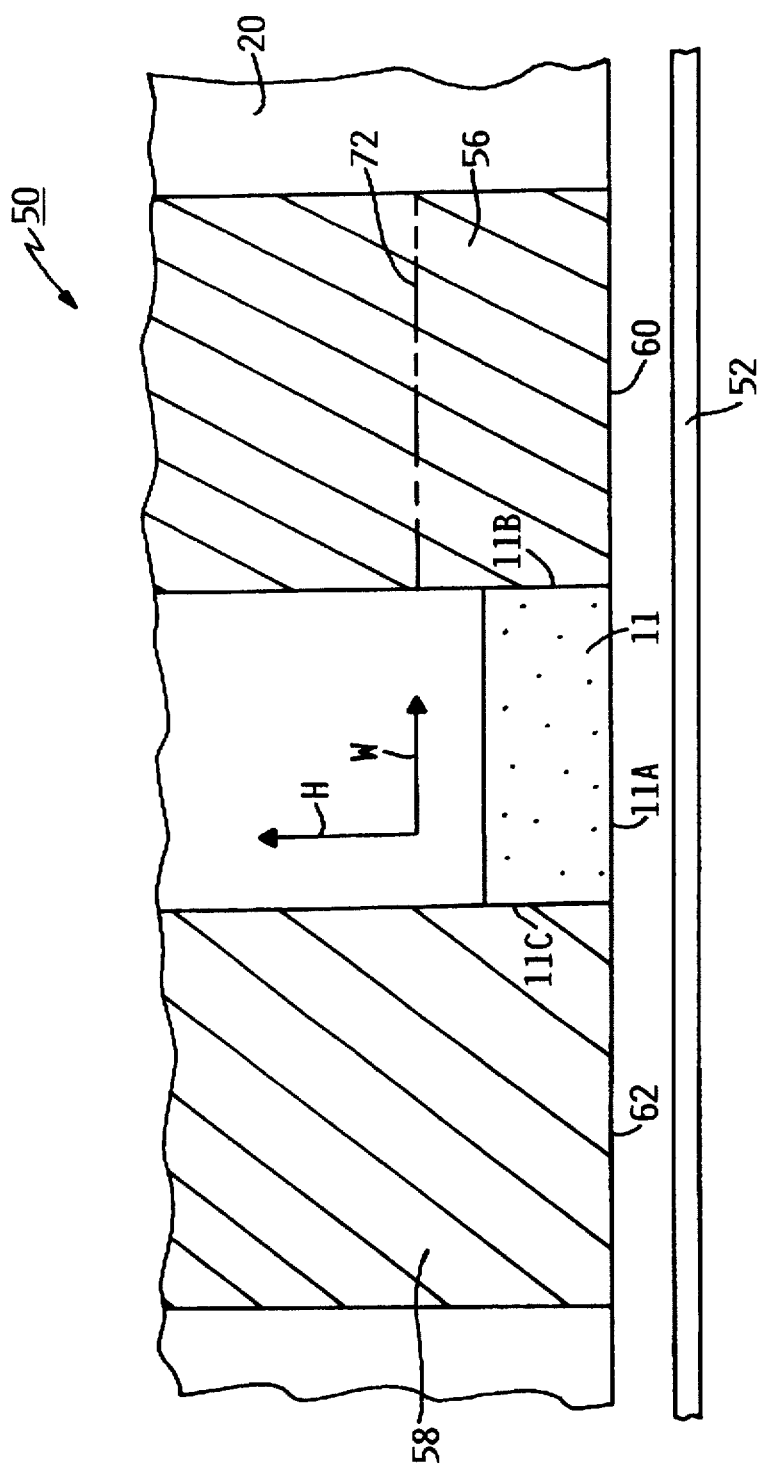
FIG. 3 is a sectional view of the MR head shown in FIG. 2.

With reference to FIGS. 2 and 3, there is shown a magnetoresistive "MR" head according to the present invention, generally designated by the reference numeral 50, for writing bits to and reading bits from a track of a magnetic medium 52 (shown only in FIG. 3) moving relative to the MR head 50. The track may be associated with a rotating magnetic disk, a magnetic tape or any other magnetic medium. FIG. 2 is a bottom view of the active surface of the MR head 50, while FIG. 3 is a sectional view of the MR head 50.

In practice, the MR head 10 is fabricated using conventional vacuum deposition techniques, such as chemical vapor deposition, ion vapor deposition and sputtering, and electroless plating and electroplating techniques. The MR head 50 includes an MR element II sandwiched between a magnetic shield layer 12 and a magnetic shield/write pole layer 54. The MR element 11 includes a bottom end 11A between side ends 11B and 11C (shown only in FIG. 3). The bottom end 11A forms a portion of the active surface of the MR head 50.

Preferably, although not shown for the sake of clarity, MR element 11 has a conventional tri-layered structure, e.g., a soft adjacent layer, an intermediate film deposited on the soft adjacent layer, and an MR film deposited on the intermediate film. The soft adjacent layer is made of a soft magnetic material such as PERMALLOY, CoZrMo and the like. The intermediate film is made of a nonmagnetic material such as Ti, $SiO_2$ and the like. The MR film is made of a magnetoresistive material such as NiFe.

The MR film is preferably 0.005 to 0.03 microns thick in direction T. For example, the MR film may be 0.03 microns thick, while the intermediate layer and the soft adjacent layer are respectively 0.01 and 0.02 microns thick. Preferably, each of the three layers of MR element 11 is 0.3 to 4 microns wide in direction W, and 0.3 to 3 microns high in direction H (shown only in FIG. 3). Though exemplified as a tri-layered structure, MR element 11 may have any other conventional structure.

The three layers of MR element 11 are successively deposited upon an insulating layer 20, which is deposited upon magnetic shield layer 12. Magnetic shield layer 12 is made of a magnetically soft and physically hard material, such as CoHfNb, and is approximately 0.5 to 2.5 microns thick in direction T. Magnetic shield/write pole layer 54 is made of PERMALLOY or other suitable material and is approximately 0.5 to 3.5 microns thick in direction T.

Hard bias magnet layers 16 and 18 are deposited on insulting layer 20 to abut against opposite sides of MR element 11. Hard bias magnet layers 16 and 18 are made of an electrically conductive and magnetically hard material such as a cobalt alloy, e.g., CoPtCr, and preferably have about the same thickness as MR element 11. Hard bias magnet layers 16 and 18 provide longitudinal magnetic biasing of the MR film of MR element 11. Longitudinal magnetic biasing of the MR film may alternatively be provide by any other conventional biasing technique, such as exchange biasing. Hard bias magnet layers 16 and 18 have a height in direction H about equal to that of MR element 11.

A lead layer 56 is deposited on hard bias magnet layer 16 and insulating layer 20. Similarly, a lead layer 58 is deposited on hard bias magnet layer 18 and insulating layer 20. Lead layers 56 and 58 respectively have ends 60 and 62 that form portions of the active surface of the MR head 50 and are to be positioned adjacent to magnetic medium 52. End 60 of lead layer 56 is thinner in direction T than end 62 of lead layer 58. Lead layers 56 and 58 are electrically connected to MR element 11 through hard bias magnet layers 16 and 18, respectively. Lead layer 56 is electrically connected to side end 11B of MR element 11, and lead layer 58 is electrically connected to side end 11C of MR element 11. Thus when a bias current is driven through MR element 11 by lead layers 56 and 58, magnetic flux flows in a circle around and through the MR film and the soft adjacent layer of MR element 11, thereby providing transverse magnetic biasing in the MR film.

Lead layer 56 and lead layer 58 can be formed in separate deposition steps. Alternatively, lead layer 56 and a lower portion of lead layer 58 can be deposited simultaneously, and the remaining portion of lead layer 58 deposited subsequently.

An insulating layer 64 is deposited on MR element 11, lead layers 56 and 58, and insulating layer 20. Magnetic shield/write pole layer 54 is deposited on insulating layer 64. The spacing between magnetic shield layer 12 and magnetic shield/write pole layer 54 is preferably 0.1 to 1 micron in direction T, with MR element 11 being about midway therebetween.

Lead layer 56 has a thickness in direction T, at least in the vicinity of end 60, that is less than the thickness of lead layer 58 in direction T in the vicinity of end 62. Preferably, the thickness of lead layer 56 in the vicinity of end 60 of less than 0.1 microns. More preferably, the thickness lead layer 56 in the vicinity of end 60 is less than one half the thickness of lead layer 58 in the vicinity of end 62. For example, the thickness of end 60 of lead layer 56 may be 0.05 microns, while the thickness of end 62 of lead layer 58 is 0.1 microns. Lead layers 56 and 58 are made of a material, such as Ta, W and the like, that provides a good compromise between resistivity, corrosion resistance and lapping behavior.

If desired, to minimize the resulting greater resistance in lead layer 56 relative to lead layer 58, a rear portion of lead layer 56 (i.e., remote from end 60) may be made thicker than the end 60 of lead layer 56. This thicker portion of lead layer 56 may begin with a step 72, as shown with a phantom line in FIG. 3. The rear portion of lead layer 56 may, for example, have the same thickness as end 62 of lead layer 58, thereby permitting the rear portion of lead layer 56 to be deposited simultaneously with the end 62 of lead layer 58.

Because the end 60 of lead layer 56 is thinner than the end 62 of lead layer 58, the topographical step from MR element 11 to end 60 of lead layer 56 is shallower than the topographical step from MR element 11 to the end 62 of lead layer 58. This relatively shallow step will be replicated in layers subsequently deposited above the end 60 of lead layer 56.

An insulating layer 66 is deposited on magnetic shield/write pole layer 54, and a write pole layer 68 is deposited on insulating layer 66. Insulating layers 20, 64 and 66 may be made of insulating materials such as $Al_2O_3$, $SiO_2$ and the like. Insulating layer 66 forms a write gap between magnetic shield/write pole layer 54 and write pole layer 68, and is preferably 0.3 to 0.6 microns thick in direction T.

The write pole layer 68 is made of PERMALLOY, for example, and is preferably 0.5 to 4 microns thick in direction T and 0.5 to 6 microns wide in direction W. The write pole layer 68 preferably has a center line 70 that is offset from the center line 34 of MR element 11 to compensate for the skew of a rotary actuator (not shown), for example. Also, the write pole layer 68 is preferably wider than MR element 11, so that MR head 50 is of the write wide/read narrow type.

More preferably, write pole layer 68 extends over end 60 of lead layer 56 and terminates over MR element 11, but does not extend over end 62 of lead layer 58. Accordingly, only the relatively shallow step created by end 60 of lead layer 56 as it rises above MR element 11 is replicated in write pole layer 68, thereby minimizing any phase differences in the bits written on magnetic medium 52 by write pole layer 68.

Figure 4:
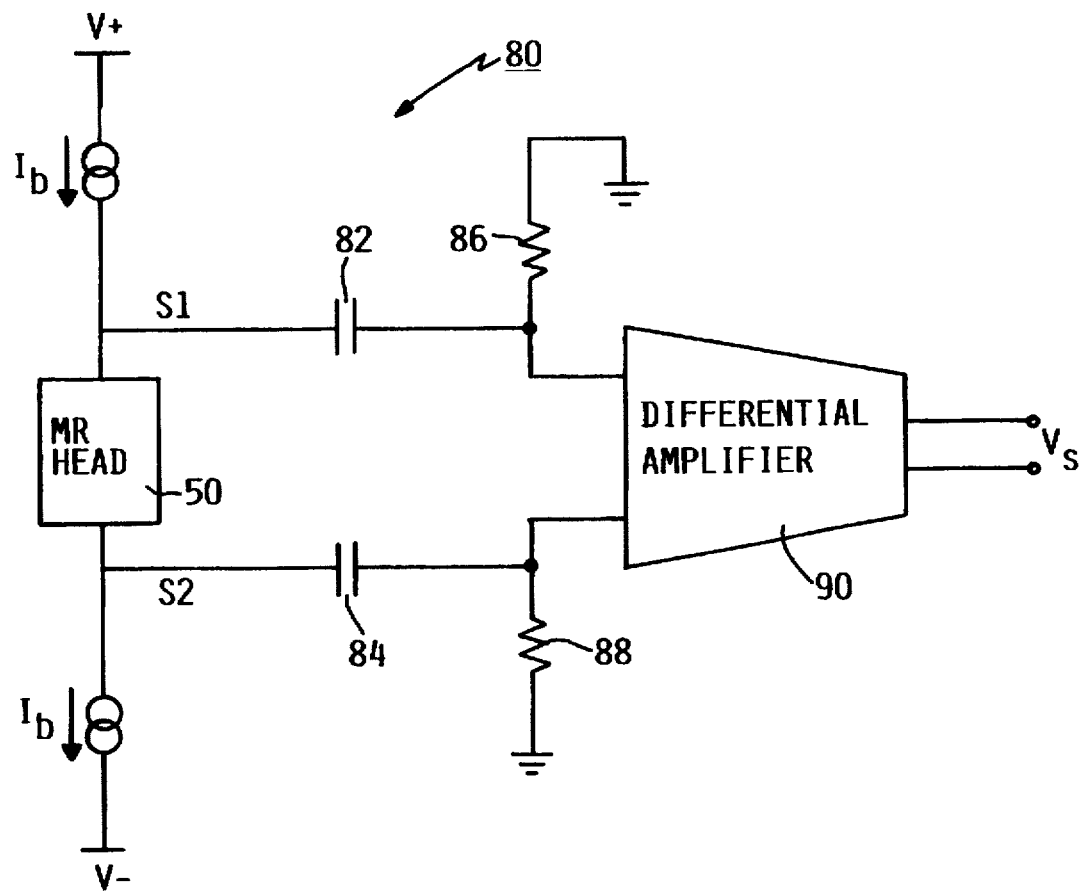
FIG. 4 is a schematic diagram of the MR head shown in FIG. 2 employed in a differential configuration.

FIG. 4 is a schematic diagram of a differential preamplification circuit 80 employing MR head 50 according to the present invention. Differential preamplification circuits employing MR heads are well known in the art, and thus are only briefly discussed herein. A constant DC current, $I_b$, is supplied to MR head 50. Capacitors 82 and 84 and resistors 86 and 88 are used to AC couple MR head 50 to a conventional differential preamplifier 90, i.e., to remove a large DC voltage component from signals $S_1$, and $S_2$ produced by the constant current $I_b$ flowing through MR head 50. Differential preamplifier 90 provides amplified output, $V_r$, that can be used to measure the changes of resistance in MR element 11. Alternatively, in a different circuit configuration that is well known in the art, a constant DC voltage, $V_b$, can be supplied to MR head 50 and a variation in current can be measured by a current sensing differential preamplifier.

In this configuration, the present invention advantageously permits a large reduction in the resistance of lead layer 58, without causing "bent bits" to be written on magnetic medium 52 by write pole layer 68. In fact, the present invention allows for a reduction in the resistance of lead layer 58 that completely compensates for any increase in the resistance of lead layer 58. The larger bump in magnetic shield/write pole layer 54 that results from making lead layer 58 thicker does not cause bent bits to be written on magnetic medium 52 because the writing width is almost entirely determined by the width of write pole layer 68, and the larger bump in magnetic shield/write pole layer 54 is outside the width of write pole layer 68.

Figure 5:
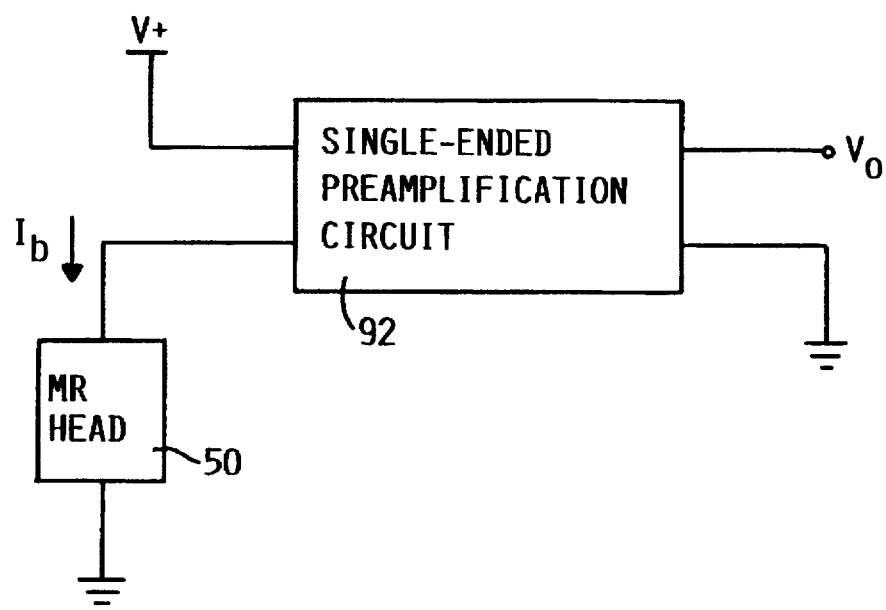
FIG. 5 is a schematic diagram of the MR head shown in FIG. 2 employed in a single-ended configuration.

FIG. 5 is a schematic diagram of MR head 50 according to the present invention used with a single-ended preamplification circuit. Single-ended preamplification circuits employing MR heads are well known in the art, and thus are only briefly discussed herein. Examples of such conventional single-ended amplification circuits are disclosed in U.S. Pat. No. 4,712,144 to Klaassen and U.S. Pat. No. 5,122,915 to Klein et al. Another example of a conventional single-ended preamplification circuit can be found in direct access storage device (DASD) model IBM H2344-A4 available from International Business Machines Corporation (IBM is a registered trademark of International Business Machines Corporation). Single-ended preamplification circuits are preferable because they are often simpler and use less power than differential preamplification circuits.

Typically, as shown in FIG.5, a conventional single-ended preamplification circuit 92 is supplied with a positive voltage (V+). A constant average DC current, $I_b$, is supplied to one of the leads of MR head 50 from single-ended preamplification circuit 92. The other lead of MR head 50 is connected to ground (as shown in FIG. 5) or a reference voltage. Though this DC average current supplied to MR head 50 remains constant, an AC current is generated by changes in the resistance of MR element 11. This AC current is amplified by single-ended preamplifier circuit 92 to provide an amplified output voltage, $V_o$. Alternatively, in a different single-ended circuit configuration that is well known in the art, a constant DC current, $I_b$, can be supplied to MR head 50 and a variation in voltage can be measured by a voltage sensing preamplifier.

Though preferable from simplicity and power consumption points of view, single-ended preamplification circuits can introduce a noise problem. As discussed below, the present invention can reduce this noise problem by configuring MR head 50 so that lead layer 58, i.e., the thicker lead, is connected to ground or the reference voltage and so that lead layer 56, i.e., the thinner lead, is connected to the single ended preamplification circuit. The inventor has found that a small capacitive coupling of a magnetic medium to an MR head, and a small capacitance from the leads of the MR head to an actuator and a suspension holding the MR head, are dominant sources of noise in the single-ended preamplification circuit. This occurs because the ground of each of these parts is not a true ground with respect to the ground of the single-ended preamplification circuit.

Figure 6:
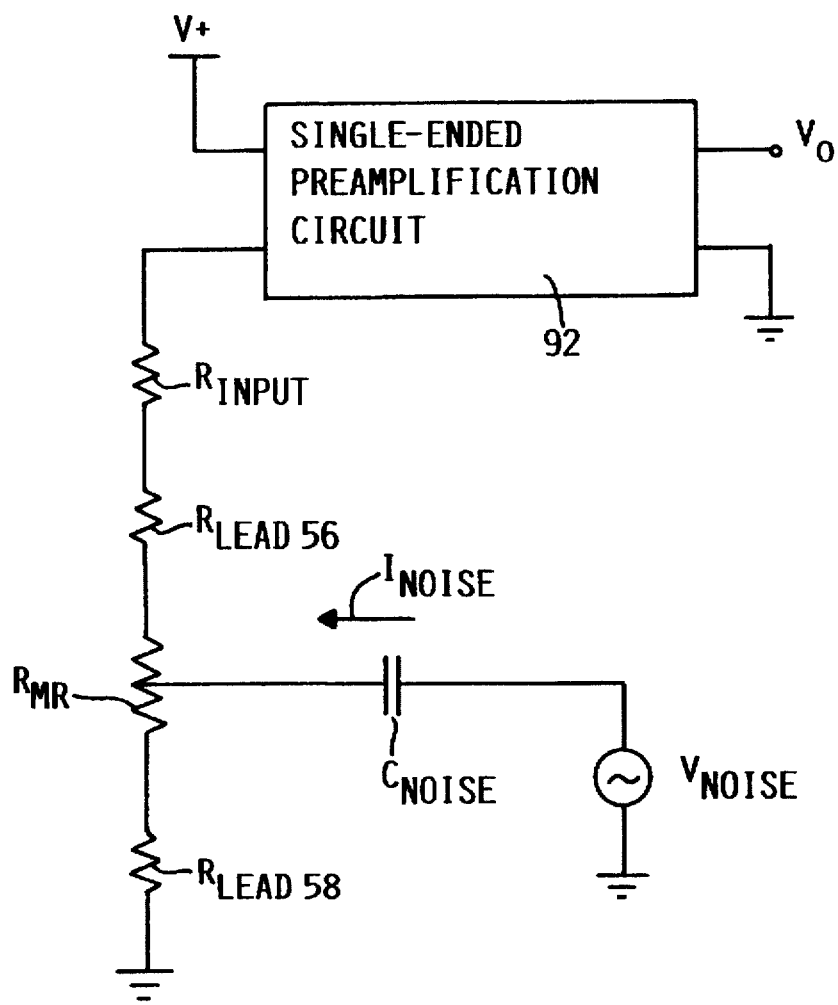
FIG. 6 is a schematic diagram of various resistances along a signal path in the single-ended configuration shown in FIG. 5.

FIG. 6 is a schematic diagram of the various resistances along the signal path from single-sided preamplification circuit 92, through MR head 50 and to ground. These resistances include an input resistance of single-ended preamplification circuit, $R_{INPUT}$; a resistance of lead layer 56, $R_{LEADS6}$; a resistance of MR element 11, $R_{MR}$; and a resistance of lead layer 58, $R_{LEADS8}$. The MR element 11 picks up noise current, $I_{NOISE}$, via a capacitive coupling, $C_{NOISE}$, at its center of resistance, $R_{MR}/2$. The total input-side resistance, $R_{T1}$, is given by the following equation.

$$R_{T1} = R_{INPUT} + R_{LEADS6} + \frac{R_{MR}}{2} \quad (1)$$

The total ground-side resistance, $R_{T2}$, is given by the following equation.

$$R_{T2} = R_{LEADS8} + \frac{R_{MR}}{2} \quad (2)$$

The parallel resistance, $R_{PAR}$, is given by the following equation.

$$R_{PAR} = \frac{R_{T1} \times R_{T2}}{R_{T1} + R_{T2}} \quad (3)$$

The input noise current, $I_{N1}$, is given by the following equation.

$$I_{N1} = \frac{R_{PAR}}{R_{T1}} \times I_{NOISE} \quad (4)$$

COMPARATIVE EXAMPLE

Each of the leads in conventional MR heads has the same thickness, e.g., about 100 nm, and resistance, e.g., about 4 ohms. Typically, the resistance of an MR element is about 20 ohms and the input resistance of a single-ended preamplification circuit is about 2.5 ohms. By solving equations (1) through (4) above, where $R_{INPUT}$ is 2.5 ohms, $R_{LEADS6}$ and $R_{LEADS8}$ are each 4 ohms, and $R_{MR}$ is 20 ohms, one finds that the input noise current $I_{N1}=0.460*I_{NOISE}$.

EXAMPLE 1

In Example 1, the resistance of lead layer 58, which is connected to ground, is decreased to about 2 ohms relative to the Comparative Example by increasing its thickness to about 200 nm. Also, the resistance of lead layer 56, which is connected to single-ended preamplification circuit 92, is increased to about 6 ohms relative to the Comparative Example by decreasing its thickness to about 67 nm. By solving equations (1) through (4) above, where $R_{INPUT}$ is 2.5 ohms, $R_{LEADS6}$ is 6 ohms, $R_{LEADS8}$ is 2 ohms, and $R_{MR}$ is 20 ohms, one finds that input noise current $I_{N1}=0.393*I_{NOISE}$. Thus, Example 1 provides a 14% reduction in the input noise current $I_{N1}$.

Moreover, in Example 1, the total resistance, $R_{T1}+R_{T2}$, of the Comparative Example is maintained at 30.5 ohms, where the same signal level is produced as in the Comparative Example. Thus, in this example, the signal level is maintained, the phase error due to "bent bits" is reduced due to the thinner lead layer 56, and the sensitivity to environmental noise picked up by MR head 50 is reduced by 14%.

EXAMPLE 2

In Example 2, the resistance of lead layer 58, which is connected to ground, is decreased to about 2 ohms, i e., one-half of that in the Comparative Example by increasing its thickness to about 200 nm. The resistance of lead layer 56, which is connected to single-ended preamplification circuit 92, is 4 ohms as in the Comparative Example. By solving equations (1) through (4) above, where $R_{INPUT}$ is 2.5 ohms, $R_{LEADS6}$ is 4 ohms, $R_{LEADS8}$ is 2 ohms, and $R_{MR}$ is 20 ohms, one finds that input noise current $I_{N1}=0.421*I_{NOISE}$. Thus, Example 2 provides an 8% reduction in the input noise current $I_{N1}$.

Moreover, in Example 2, the total resistance, $R_{T1}+R_{T2}$, of the Comparative Example is reduced from 30.5 ohms to 28.8 ohms, which will also increase the data signal by 8%. This results in a 16% reduction of input noise current $I_{N1}$ relative to the data signal. The lower source resistance also reduces the thermal noise input to single-ended preamplification circuit 92 by about 3%. Thus, in this example, the level of phase error due to "bent bits" is maintained, while achieving the improvement of increased signal and lower noise.

Both Examples 1 and 2 advantageously reduce the resistance of lead layer 58, which is connected to ground or the reference voltage, without causing bent bits to be written on magnetic medium 52 by write pole layer 68. The larger bump in magnetic shield/write pole layer 54 that results from making lead layer 58 thicker does not cause bent bits to be written on magnetic medium 52 because the writing width is almost entirely determined by the width of write pole layer 68, and the larger bump in magnetic shield/write pole layer 54 is outside the width of write pole layer 68.

The resistance of lead layer 58 can alternatively be reduced by any combination of material selection and increased cross-section, i.e., thickness and width, and reduced length.

Figure 7:
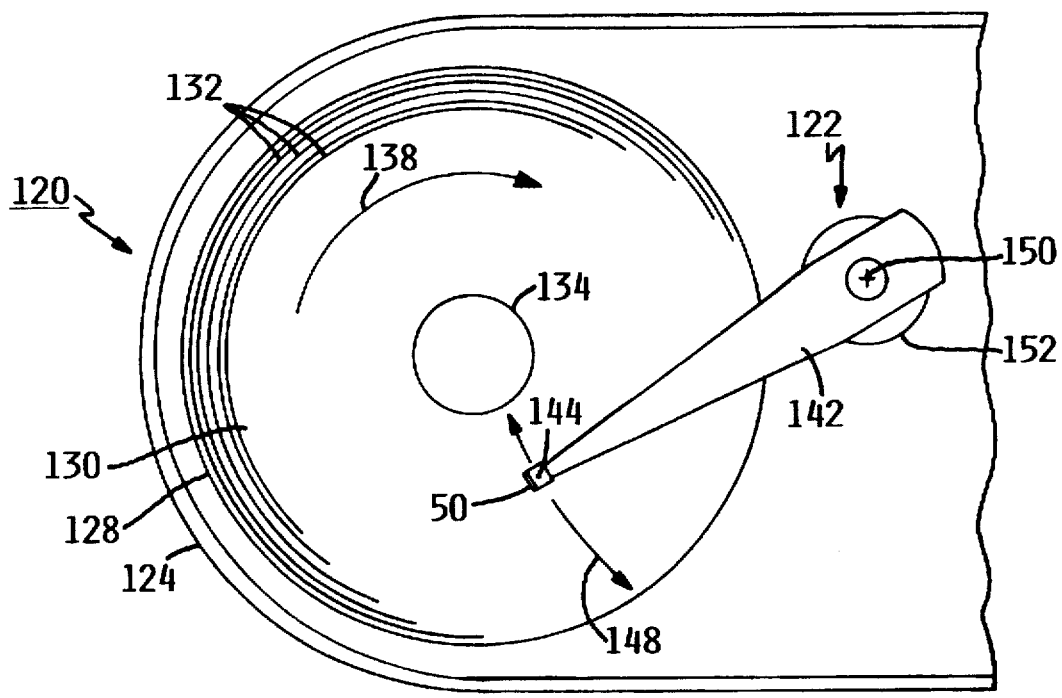
FIG. 7 is a top plan view of a direct access strorage device employing the MR head shown in FIG. 2.

FIG. 7 is a top plan view of a direct access storage device 120, i.e., a magnetic disk drive unit, employing a plurality of MR heads 50 (only one MR head is shown). The direct access storage device 120 includes a rotary actuator assembly 122 and a housing 124, which encloses a stack of disks 128 (only one disk is shown) having opposed magnetic surfaces 130 (only one surface is shown). Disks 128 have numerous information tracks 132 arranged in a concentric pattern on the magnetic surfaces 130. The disks 128 are mounted in parallel for simultaneous rotation by an integral spindle and motor assembly 134. A disk controller (not shown) operatively controls the integrated spindle and motor assembly 134 for rotating the disks 128, for example, at a substantially constant velocity in a clockwise (CW) direction, as indicated by an arrow 138 in FIG. 7.

Rotary actuator assembly 122 includes a plurality of arms 142 (only one arm is shown), each supporting at least one slider 144 relative to a corresponding disk surface 130. Each slider 144 incudes an air bearing surface (not shown) and has at least one MR head 50 mounted to a side surface. Support arms 142 are driven rotatably and bidirectionally by an actuator driver (not shown) for moving the MR heads 50 in an arc from one track 132 to another track 132 as indicated by an arrow 148 in FIG. 7. Support arms 142 are mounted on a pivot 150 defining an axis of rotation for MR heads 50. Pivot 150 can include a bearing cartridge 152 for simultaneous positioning of the MR heads 50 adjacent to disk surfaces 130.

While several embodiments of the present invention have been shown and described, other variations will be readily apparent to those skilled in the art. Therefore, the present invention is not limited to these embodiments but is intended to cover all such variations as fall within the scope of the present invention defined by the claims that follow.

What is claimed is:

1. A magnetoresistive head, comprising:
   an insulation layer;
   a magnetoresistive film provided over said insulation layer, said magnetoresistive film including a first side end, a second side end and a bottom end therebetween, said bottom end forming a portion of an active surface of said magnetoresistive head, wherein said active surface of said magnetoresistive head is to be positioned adjacent and substantially parallel to a magnetic medium;

a first lead layer provided over said insulation layer and electrically connected to said first side end of said magnetoresistive film, said first lead layer having an end forming a portion of said active surface of said magnetoresistive head;

a second lead layer provided over said insulation layer and electrically connected to said second side end of said magnetoresistive film so that a bias current driven through said magnetoresistive film by said first and second lead layers will flow from one of said first and second side ends of said magnetoresistive film to the other one of said first and second side ends of said magnetoresistive film, said second lead layer having an end forming a portion of said active surface of said magnetoresistive head, said end of said second lead layer having a thickness greater than a thickness of said end of said first lead layer by a predetermined amount; and a write pole layer extending over said first lead layer and terminating over said magnetoresistive film so that said write pole layer does not extend over said end of said second lead layer.

2. A magnetoresistive head as recited in claim 1, wherein said thickness of said end of said first lead layer is less than or about 0.1 microns.

3. A magnetoresistive head as recited in claim 2, wherein said thickness of said end of said first lead layer is less than or about one half said thickness of said end of said second lead layer.

4. A magnetoresistive head as recited in claim 1, wherein said first lead layer has a step portion having a thickness greater than said thickness of said end of said first lead layer.

5. A magnetoresistive head as recited in claim 1, wherein said first lead layer is connected to a single-ended preamplification circuit.

6. A magnetoresistive head as recited in claim 5, wherein said second lead layer is connected to a ground or a reference voltage.

7. A magnetoresistive head as recited in claim 1, wherein said first and second lead layers are each connected to a differential preamplifier.

8. A magnetoresistive head, comprising:

an insulation layer;

a magnetoresistive film provided over said insulation layer, said magnetoresistive film including a first side end, a second side end and a bottom end therebetween, said bottom end forming a portion of an active surface of said magnetoresistive head, wherein said active surface of said magnetoresistive head is to be positioned adjacent and substantially parallel to a magnetic medium;

a first lead layer provided over said insulation layer and electrically connected to said first side end of said magnetoresistive film, said first lead layer having an end forming a portion of said active surface of said magnetoresistive head;

a second lead layer provided over said insulation layer and electrically connected to said second side end of said magnetoresistive film so that a bias current driven through said magnetoresistive film by said first and second lead layers will flow from one of said first and second side ends of said magnetoresistive film to the other one of said first and second side ends of said magnetoresistive film, said second lead layer having an end forming a portion of said active surface of said magnetoresistive head, said end of said second lead layer has a thickness greater than a thickness of said end of said first lead layer, said end of said second lead layer having an electrical resistance less than an electrical resistance of said end of said first lead layer by a predetermined amount; and a write pole extending over said first lead layer and terminating over said magnetoresistive film so that said write pole does not extend over said end of said second lead layer.

9. A magnetoresistive head as recited in claim 8, wherein said thickness of said end of said first lead layer is less than or about 0.1 microns.

10. A magnetoresistive head as recited in claim 9, wherein said thickness of said end of said first lead layer is less than or about one half said thickness of said end of said second lead layer.

11. A magnetoresistive head, comprising:

an insulation layer;

a magnetoresistive film provided over said insulation layer, said magnetoresistive film including a first side end, a second side end and a bottom end therebetween, said bottom end forming a portion of an active surface of said magnetoresistive head, wherein said active surface of said magnetoresistive head is to be positioned adjacent and substantially parallel to a magnetic medium;

a first lead layer provided over said insulation layer and electrically connected to said first side end of said magnetoresistive film;

a second lead layer provided over said insulation layer and electrically connected to said second side end of said magnetoresistive film, wherein said magnetoresistive film, said first lead layer and said second lead layer co-extend along an axis substantially parallel to said magnetic medium, wherein said second lead layer having an electrical resistance less than an electrical resistance of said first lead layer by a predetermined amount, and wherein said first lead layer is connected to a single-ended preamplification circuit.

12. A magnetoresistive head as recited in claim 11, wherein said second lead layer is connected to a ground or a reference voltage.

13. A method of fabricating a magnetoresistive head, comprising the steps of:

(a) depositing a magnetoresistive film over a first portion of an insulation layer, said magnetoresistive film including a first side end, a second side end and a bottom end therebetween, said bottom end forming a portion of an active surface of said magnetoresistive head, wherein said active surface of said magnetoresistive head is to be positioned adjacent and substantially parallel to a magnetic medium;

(b) depositing a first lead layer over a second portion of said insulation layer so that said first lead layer is electrically connected to said first side end of said magnetoresistive film and so that said first lead layer has an end forming a portion of said active surface of said magnetoresistive head;

(c) depositing a second lead layer over a third portion of said insulation layer so that said second lead layer is electrically connected to said second side end of said magnetoresistive film whereby a bias current driven through said magnetoresistive film by said first and second lead layers will flow from one of said first and second side ends of said magnetoresistive film to the other one of said first and second side ends of said magnetoresistive film and so that said second lead layer has an end forming a portion of said active surface of said magnetoresistive head, said step of depositing said second lead layer including a substep of forming said end of said second lead layer to have a thickness greater than a thickness of said end of said first lead layer by a predetermined amount; and (d) depositing a write pole layer to extend over said first lead layer and to terminate over said magnetoresistive film so that said write pole layer does not extend over said end of said second lead layer.

14. A method of fabricating a magnetoresistive head as recited in claim 13, wherein step (b) includes a substep of:

(b1) forming a step portion in said first lead layer, said step portion having a thickness greater than said thickness of said end of said first lead layer.

15. A method of fabricating a magnetoresistive head as recited in claim 14, wherein said thickness of said end of said second lead layer is about equal to said thickness of said step portion of said first lead layer.

16. A direct access storage device, comprising:

a housing;

at least one disk mounted in said housing for rotation about an axis;

a plurality of tracks for storing data on at least one surface of said disk, said tracks being arrayed in a pattern around said axis;

a magnetoresistive head, said magnetoresistive head having an insulation layer, a magnetoresistive film provided over said insulation layer, said magnetoresistive film including a first side end, a second side end and a bottom end therebetween, said bottom end forming a portion of an active surface of said magnetoresistive head, wherein said active surface of said magnetoresistive head is positioned adjacent and substantially parallel to said at least one surface of said disk, a first lead layer provided over said insulation layer and electrically connected to said first side end of said magnetoresistive film, said first lead layer having an end forming a portion of said active surface of said magnetoresistive head, a second lead layer provided over said insulation layer and electrically connected to said second side end of said magnetoresistive film so that a bias current driven through said magnetoresistive film by said first and second lead layers will flow from one of said first and second side ends of said magnetoresistive film to the other one of said first and second side ends of said magnetoresistive film, said second lead layer having an end forming a portion of said active surface of said magnetoresistive head, said end of said second lead layer having a thickness greater than a thickness of said end of said first lead layer by a predetermined, amount and a write pole layer extending over said first lead layer and terminating over said magnetoresistive film so that said write pole layer does not extend over said end of said second lead layer; and an actuator operatively connected to said magnetoresistive head for moving said magnetoresistive head relative to said at least one surface of said disk.

17. A magnetoresistive head, comprising:

a magnetoresistive film including a first side end, a second side end and a bottom end therebetween, said bottom end forming a portion of an active surface of said magnetoresistive head, wherein said active surface of said magnetoresistive head is to be positioned adjacent and substantially parallel to a magnetic medium;

a first lead layer electrically connected to said first side end of said magnetoresistive film;

a second lead layer electrically connected to said second side end of said magnetoresistive film, wherein said magnetoresistive film, said first lead layer and said second lead layer co-extend along an axis substantially parallel to said magnetic medium, and wherein said second lead layer having an electrical resistance less than an electrical resistance of said first lead layer by a predetermined amount; and a single-ended preamplification circuit, said first lead layer being electrically connected to said single-ended preamplification circuit.

* * * * *